United States Patent [19]

Greene

[11] 3,940,983
[45] Mar. 2, 1976

[54] FARADAY EFFECT FLUID FLOW AND DIRECTION INDICATOR

[75] Inventor: Leonard M. Greene, Chappaqua, N.Y.

[73] Assignee: Safe Flight Instrument Corporation, White Plains, N.Y.

[22] Filed: Mar. 19, 1975

[21] Appl. No.: 559,675

[52] U.S. Cl. ............... 73/181; 73/189; 73/194 EM
[51] Int. Cl.² ........................................... G01P 5/08
[58] Field of Search ............... 73/181, 189, 194 E

[56] References Cited
UNITED STATES PATENTS

| | | | |
|---|---|---|---|
| 2,907,207 | 10/1959 | Rinia | 73/194 EM |
| 3,777,561 | 12/1973 | Lewis | 73/181 |

*Primary Examiner*—James J. Gill
*Attorney, Agent, or Firm*—Edward A. Sokolski

[57] ABSTRACT

A pair of concentric electrodes are mounted at one end of a housing fixedly supported on a body and positioned in a fluid, the flow of which is to be measured relative to the body. A permanent magnet is rotatably mounted in the housing proximate to the electrodes and is rotatably driven. Reference signal generating means is also mounted in the housing to generate a pair of pulsating reference signals having a predetermined phase relationship with each other and with the rotation of the magnet. Alternating current signals are generated between the electrodes, these signals having a magnitude and phase in accordance with the speed and direction of fluid flow relative to the electrodes. These signals are fed from the electrodes through leads, which are positioned coaxial with the magnet rotation axis, to detector circuits which in conjunction with the reference signals generate signals in accordance with the speed, acceleration and direction of fluid flow, these signals being utilized to drive appropriate indicators.

15 Claims, 14 Drawing Figures

FARADAY EFFECT FLUID FLOW AND DIRECTION INDICATOR

This invention relates to a Faraday effect fluid flow indicator and more particularly to such a device which generates an electrical signal in accordance with the speed, acceleration and direction of fluid flow relative to a body in which the device is fixedly mounted.

Fluid flow detecting and indicating devices are useful for a number of purposes, such as the determination of the motion of a boat through the water, the measurement of the flow of the water in a river, flood control channel or sewer, and the monitoring of fluid flow in industrial processes. Faraday effect sensors have been developed in the prior art for this purpose, such as for example described in U.S. Pat. No. 3,777,561, issued Dec. 11, 1973, to John R. Lewis and assigned to Safe Flight Instrument Corporation, the assignee of the present application. This type of device provides an advantage over prior art devices using propellers and paddle wheels, in that it avoids the tendency of such prior art devices of becoming fouled and of changing calibration due to slime buildup. This type of device also avoids the shortcomings of certain prior art devices that utilize rods which protrude from the mounting body and are subject to being broken off or fouled. The device of the aforementioned prior art patent, however, has the following shortcomings. First, it provides a reading only of the speed of the water flow relative to the body on which the instrument is mounted and no signal indicative of the direction of such flow or of flow acceleration. Further, in this prior art device, stray extraneous signals are not eliminated to the extent to be desired.

The device of the present invention overcomes the shortcomings of the prior art in providing a Faraday effect flow detecting and indicating device which provides an output display indicative of the speed, acceleration and direction of the fluid flow relative to a body on which the device is mounted. Further, by symmetrically arranging the electrodes in coaxial relationship, by positioning the leads of these electrodes along an axis coaxial with the rotation axis of the magnet, and by providing an isolation transformer between the leads and the electronic processing circuitry, the pickup of stray signals is minimized.

Referring to the figures.

Figure 3:
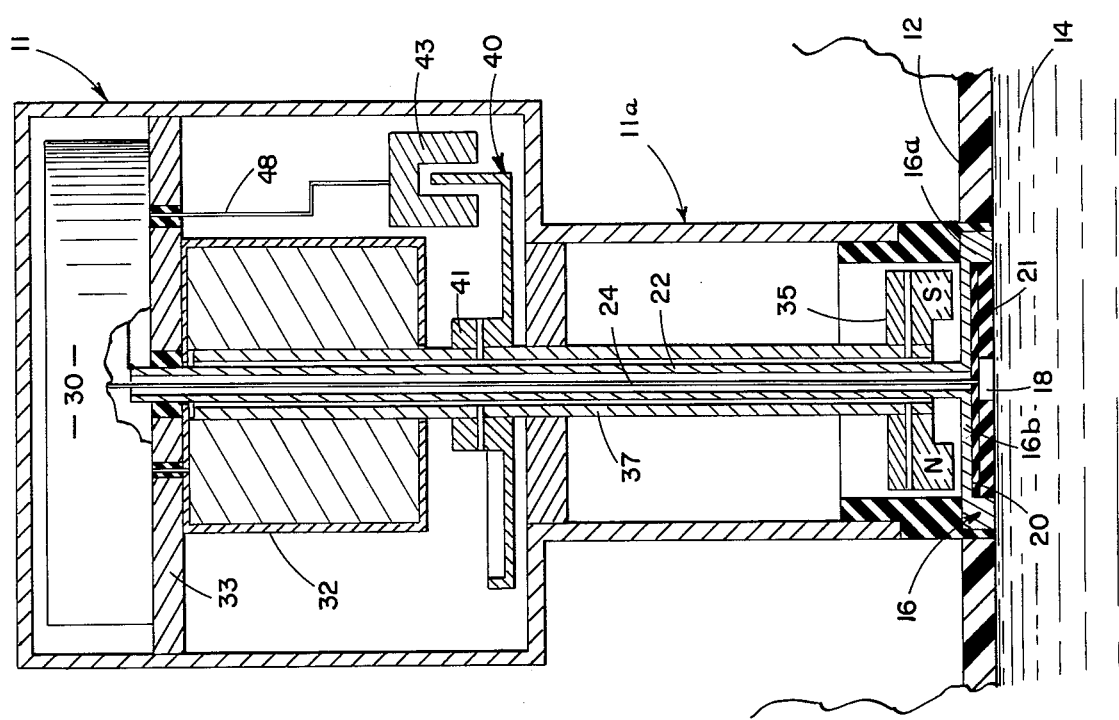
FIG. 3 is a cross sectional view taken along the plane indicated by 3—3 in FIG. 1.

It is to be noted that the device of the invention can be utilized in a variety of applications where an indication of the flow of a conductive fluid relative to a body is required. Such applications include a speed indicator for a boat, a device for measuring the flow of a body of water such as a river or the water in a flood control channel or sewer, and fluid flow measurements in industrial processes, among others.

Briefly described, the invention is as follows: Mounted at one end of an appropriate support structure which may comprise the housing for the device, are a pair of coaxially arranged electrodes, the support structure being mounted on a body along the surface of which there is a flow of fluid which is to be measured. The electrodes are positioned in the fluid. In close proximity to the electrodes, a permanent magnet is rotatably mounted, this magnet being rotatably driven at a predetermined speed by drive means such as a motor about an axis coaxial with the electrodes. Leads are provided to conduct current from the electrodes to electronic processing circuitry, these leads being arranged coaxially with the rotation axis of the magnet and being fed to such circuitry through an isolation transformer so as to minimize stray pickup. Means for generating a pair of pulsating reference signals is driven synchronously with the rotation of the magnet and provides a pair of reference signals which have a predetermined phase relationship with each other and with the magnet rotation.

An electric potential is generated between the electrodes in accordance with the velocity (magnitude and direction) of the fluid flow relative to the electrodes, this by virtue of the cutting of the magnetic flux lines by the conductive fluid. This potential is presented in the form of an AC signal in view of the rotation of the magnet, this signal being at a frequency in accordance with the speed of such rotation. The electronic processing circuitry receives the signals from the electrodes and the reference signals which are preferably in quadrature phase relationship with each other, and generates a first signal in accordance with the component of fluid flow along one axis (e.g., the longitudinal axis of the body or boat), and a second output signal which represents the component of fluid flow normal to the first mentioned axis (e.g., flow lateral to the longitudinal axis of the body or boat). These signals may be appropriately processed to provide output signals indicative of the speed, acceleration and direction of fluid flow, or water speed, boat acceleration and direction in the case of a boat.

Referring now to FIGS. 1–4, the structural features of a preferred embodiment of the invention are illustrated. Housing 11 which houses all of the components of the device and provides a support structure therefor is fixedly mounted on body 12, which may comprise the hull of a boat or other support structure relative to which the flow of fluid 14 is to be measured. The lower portion 11a of the housing is mounted with an end face 11b thereof substantially flush with the surface of body 12. End face 11b is directly exposed to the fluid 14. An electrical connector 15 is provided to feed electrical power to the instrument and to provide signal outputs to indicators which may be positioned at remote locations.

Figure 2:
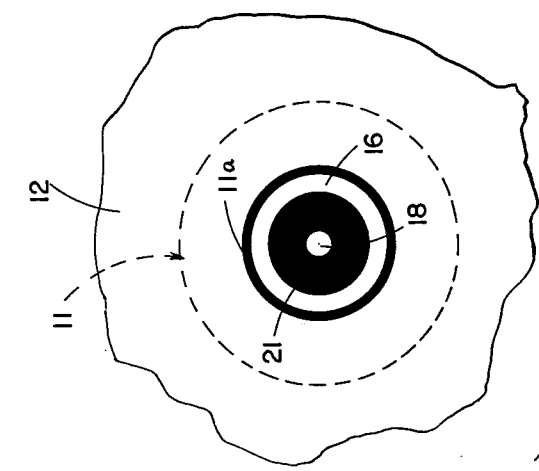
FIG. 2 is a bottom plan view of the embodiment of FIG. 1.
Figure 1:
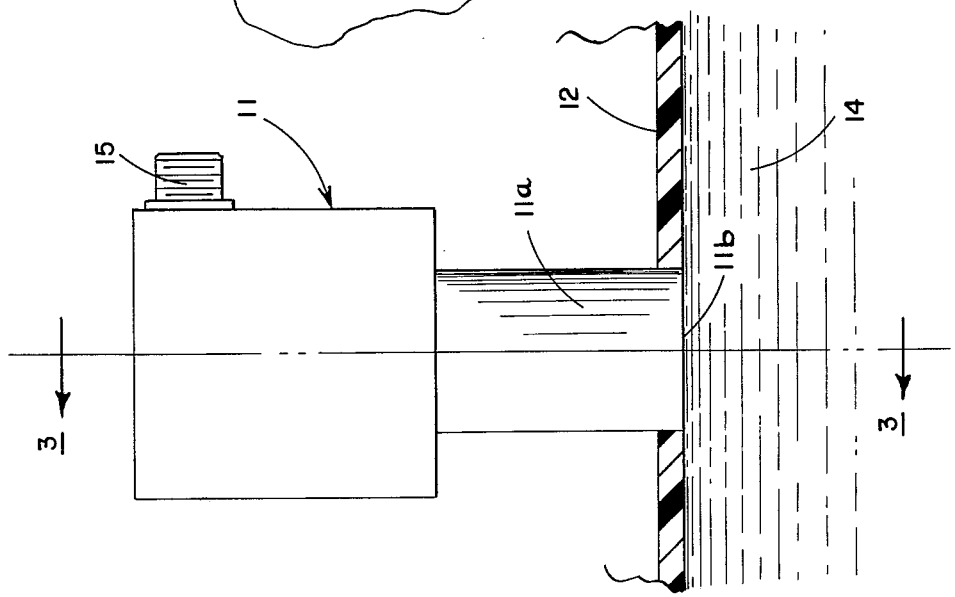
FIG. 1 is a side elevational view showing the outside structure of a preferred embodiment of the invention mounted in an operative environment.

Referring now more particularly to FIGS. 2 and 3, fixedly mounted in lower housing portion 11a and forming the bottom face portion 11b thereof are outer electrode 16 and inner electrode 18. Electrodes 16 and 18 are fabricated of an electrically conductive non-magnetic material such as copper and are in coaxial relationship with each other and the rotation axis of magnet 35, inner electrode 18 being at the center of the housing 11. Inner electrode 18 is preferably circular in shape, while outer electrode 16 may be formed as shown with an outer ring portion 16a and an inner disc-shaped portion 16b. Electrode 18 is fixedly supported on disc-shaped insulator 20, as for example by cementing thereto. A disc-shaped insulating sheet 21 is used to cover insulator 20 and to fill the space between the electrodes, this insulator being of a material which has anti-foul characteristics.

Fixedly supported on the inner portion 16b of electrode 16 is a hollow cylindrical conduit 22 of highly conductive material, which serves to carry signals from the electrode to the processing circuitry housed in casing 30 which is located in the upper part of the housing. Electrode 18 is connected to the circuitry in casing 30 by means of lead line 24. Electrodes 16 and 18 and their respective leads 22 and 24 are electrically insulated from each other as well as shaft 37 and other proximate conductive structure. It is to be noted that conduit 22 and lead line 24 are coaxial with the rotation axis of magnet 35, thus minimizing the pickup of stray signals generated by the magnet.

Electric motor 32 is fixedly supported on the bottom of shelf 33 of housing 11. Fixedly attached to the end of motor drive shaft 37 and rotatably driven thereby is two-pole permanent magnet 35, this magnet being positioned in close proximity to electrodes 16 and 18. Also fixedly attached to motor drive shaft 37 and rotatably driven thereby is timing shutter assembly 40, the structure of this assembly being best shown in FIG. 4. Shutter assembly 40 may be clamped to shaft 37 by means of clamping sleeve 41 which is integrally formed with the assembly. A pair of photoelectric transducers 42 and 43 which are spaced 90° from each other about the rotation axis of shaft 37 are fixedly mounted in housing 11 so as to provide pulsing reference signals with the rotation of shutter assembly 40, as to be described more fully in connection with FIGS. 4 and 5. All of the electronic processing circuitry is contained within casing 30 mounted on shelf 33. As already noted, signals in accordance with fluid flow are fed to the electronic processing circuitry by means of lead members 22 and 24. Signals from the photoelectric transducers 42 and 43 are fed to the processing circuitry by means of leads 48.

Figure 9:
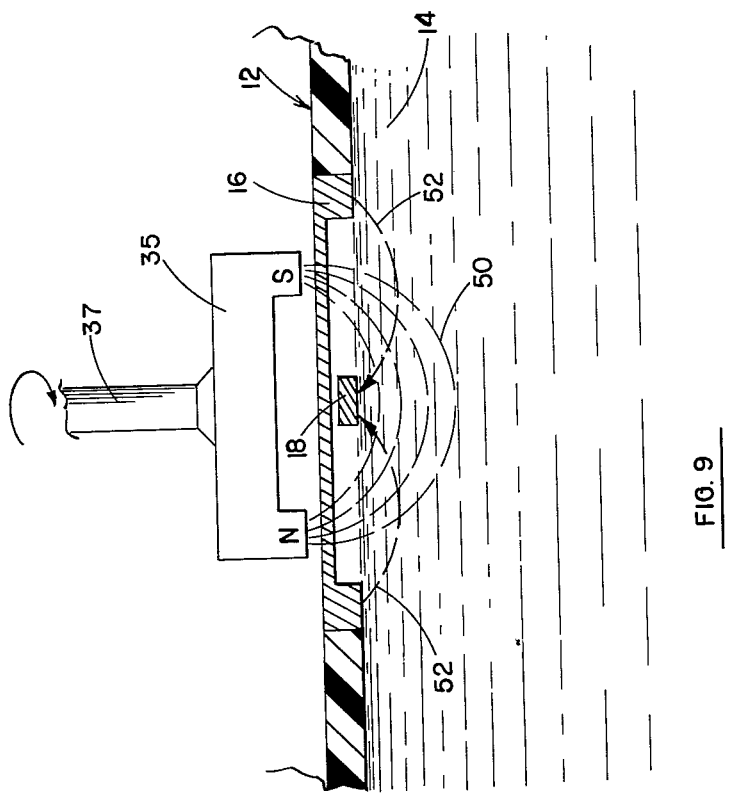
FIG. 9 is a schematic drawing illustrating the operation of the detector of the invention.
Figure 7:
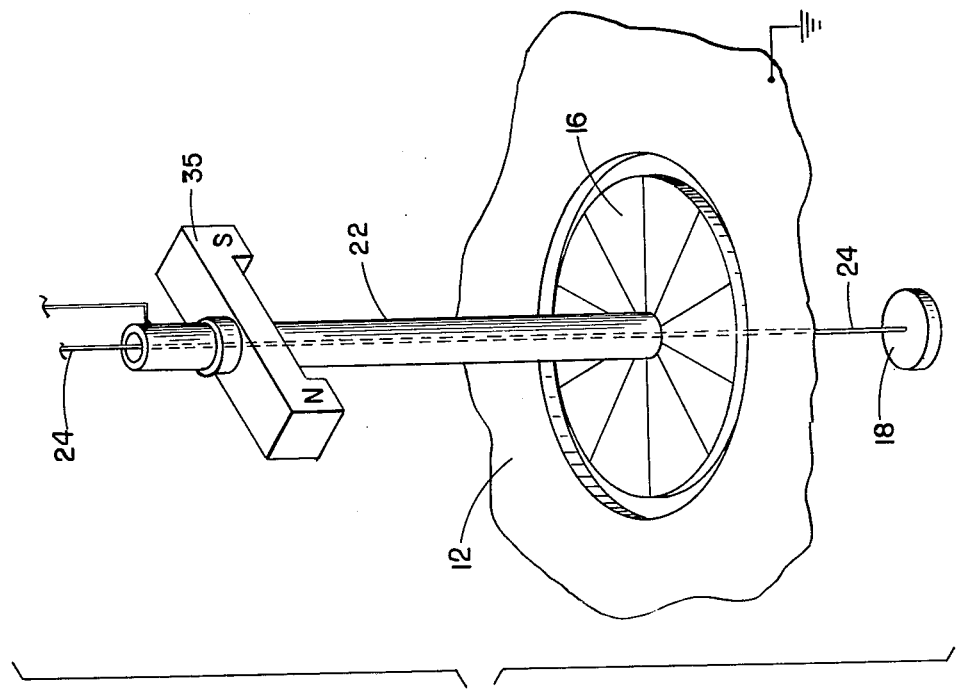
FIG. 7 is an exploded perspective view illustrating the structure of the electrodes and the magnet of the preferred embodiment.

Referring now additionally to FIGS. 7 and 9, the structure and operation of the magnet and electrode assemblies are illustrated. Permanent magnet 35 is rotated at a speed (e.g. 1,500 rpm) which is preferably not a harmonic of half the power line frequency in use in the area in which the equipment is to be used (usually 60 Hertz). Referring now to FIG. 9, the generation of signals in the device of the invention is schematically illustrated. It is to be noted that electrodes 16 and 18 are fabricated of a highly conductive but non-magnetic material, so that the electrodes do not provide a magnetic shield for the flux generated by magnet 35. Magnetic flux lines are provided in conductive fluid 14 between the north and south poles of magnet 35 as indicated by dashed lines 50 in FIG. 9.

Let us first assume that the magnet is stationary and there is relative movement between fluid 14 and body 12. This will result in a cutting of flux lines 50 by the conductive fluid, which can be likened to conductive wires extending between electrodes 16 and 18. This produces a DC current flow between electrodes 16 and 18, as indicated by arrows 52. The rotation of the magnet effectively converts this DC signal to an AC signal having a magnitude in accordance with the relative speed of flow between the body and the fluid, the phase of this AC signal being in accordance with the direction of flow relative to a predetermined reference direction. It is to be noted that with magnet 35 rotating, in the absence of any fluid flow relative to body 12, no current flow occurs between the electrodes in view of the lack of movement between these electrodes and the "conductors" formed by the liquid. The conversion of the signals to AC has a number of advantages, among these being facilitation of amplification, the elimination of errors due to extraneous DC signals developed in the fluid, and the elimination of electrolysis which would corrode the electrodes.

Figure 4:
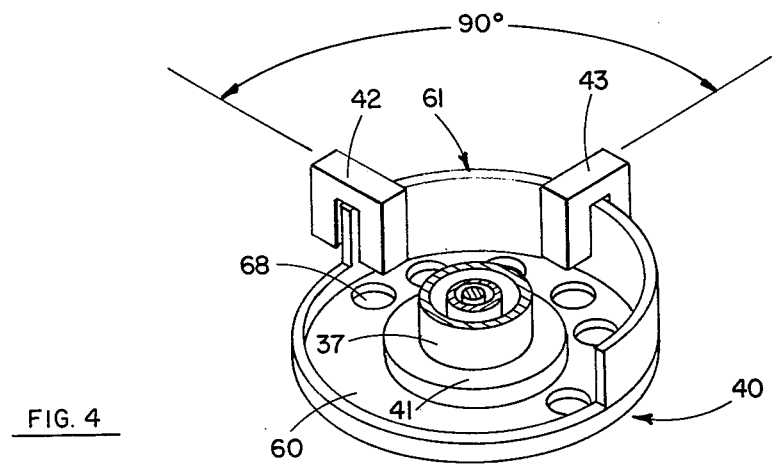
FIG. 4 is a perspective view illustrating means for generating the reference signals which may be used in the preferred embodiment.
Figure 5:
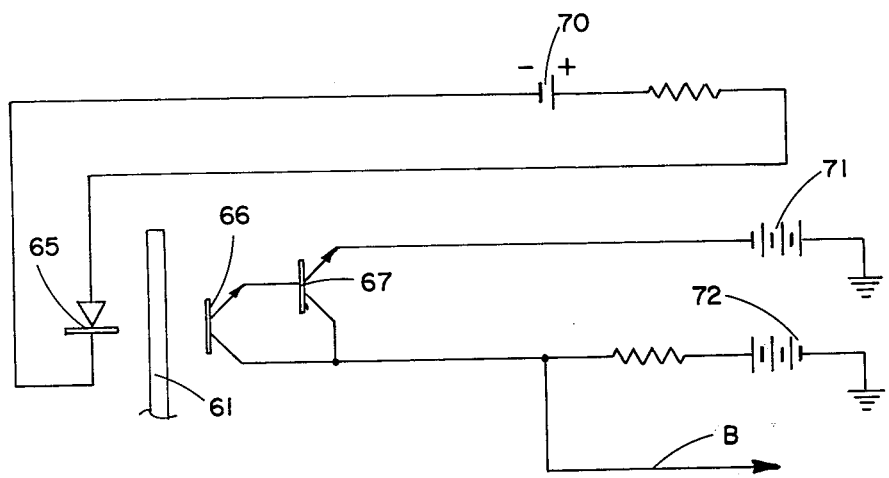
FIG. 5 is a schematic drawing illustrating circuitry which may be used in implementing the operation of the detectors of FIG. 4.
Figure 6:
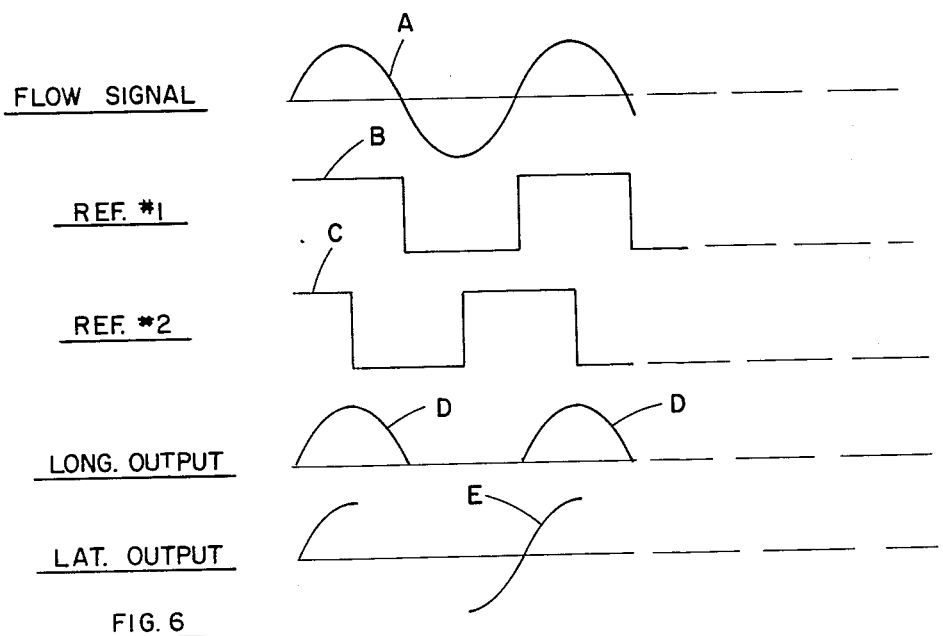
FIG. 6 is a series of wave forms illustrating the operation of the device of the invention.

Referring now to FIGS. 4 and 5, a mechanism which may be utilized in the preferred embodiment for generating reference signals is illustrated. It is to be noted that while the mechanization shown for the preferred embodiment involves utilization of a particular photoelectric technique, that appropriate reference signals can be generated for performing the desired functions in other manners well known in the art, such as, for example, by magnetic techniques or other types of optical arrangements. Timing shutter assembly 40 is fixedly attached to motor drive shaft 37 by means of clamping sleeve 41. The timing shutter assembly includes a platen 60 which has a light fence 61 formed along one half of its circumference. Fixedly mounted in housing 11 and spaced from each other by 90° about the rotational axis of shaft 37 are a pair of photoelectric transducers 42 and 43. Photoelectric transducers 42 and 43 are similar to each other and each includes a light emitting diode 65 positioned on one side of fence 61 and a phototransistor 66 positioned on the other side thereof as shown in FIG. 5. Holes 68 are provided in platen 60 to balance the assembly for rotation. The output of phototransistor 66 is amplified by transistor 67. Biasing and operating voltages are provided for the LED and the transistors by means of power sources 70–72. Each of photoelectric assemblies 42 and 43 generates a square wave signal of one cycle for each revolution of shaft 37, these signals being fed to transistors 70 and 71 as reference signals (see FIG. 8). These reference signals are in quadrature relationship as shown in FIG. 6 (waveforms "B" and "C").

Figure 8:
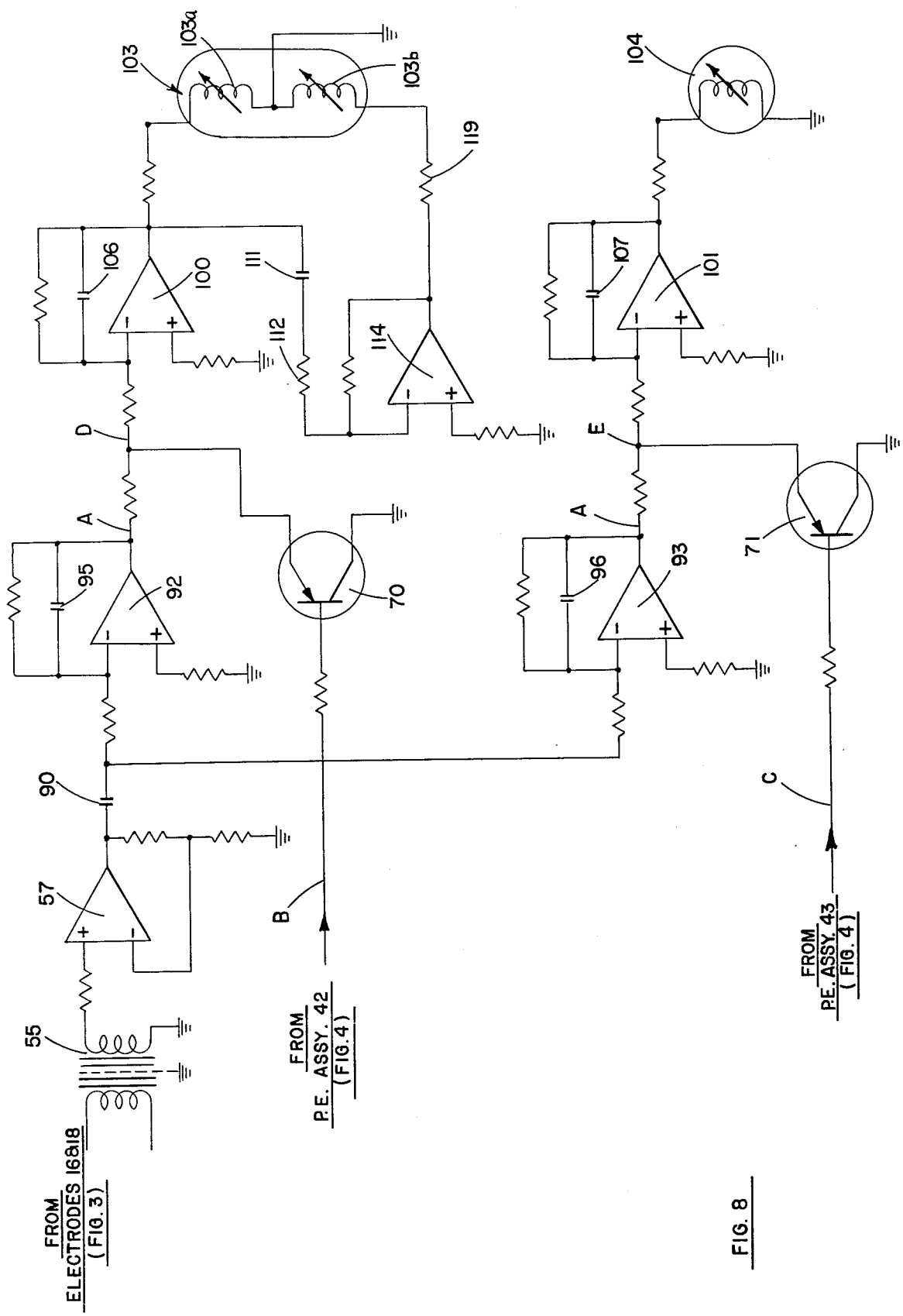
FIG. 8 is a schematic drawing illustrating circuitry utilized to process the signal output of the electrodes.

Referring now to FIG. 8, electronic processing circuitry for handling the signals is schematically illustrated. The signals generated between electrodes 16 and 18 are fed to the primary winding of isolation transformer 55. The signals are fed from the secondary of this transformer to preamplifier 57, from where they are coupled through capacitor 90 to the inputs of amplifiers 92 and 93. Amplifiers 92 and 93 utilize filter capacitors 95 and 96 respectively in their feedback circuits to filter out high frequency extraneous signals. The outputs of amplifiers 92 and 93 are typically in the general form of a sine wave, as indicated by the waveform labeled "A" in FIG. 6. Transistors 70 and 71 operate as phase detectors and are switched on and off in response to the signals "B" and "C" (shown in FIG. 6) respectively. Thus, as illustratively shown in FIG. 6, there will be a maximum amplitude pulsating DC output of one polarity at point "D" when the input signal "A" and the reference signal "B" are in phase. It also should be apparent that where the input signal and the reference signal are 180° out of phase, the output signal will also have a maximum amplitude but of an opposite polarity. Where the input signal "A" and the reference signal "C" are in quadrature phase relationship, the output "E" (see FIG. 6) will be a pulsating signal having equal opposite polarity components resulting in a zero DC output.

It should be immediately apparent that if photoelectric assembly 42 is aligned to provide a reference signal representing a predetermined "longitudinal" flow direction and photoelectric assembly 43 is aligned to provide a reference signal representing a predetermined lateral flow direction, outputs will be provided at points "D" and "E" (FIG. 8) representing the "longitudinal" flow and the "lateral" flow respectively.

The outputs appearing at points "D" and "E" (FIG. 8) are amplified by means of amplifiers 100 and 101 respectively, these amplified outputs being fed to the longitudinal flow velocity coil 103a of indicator 103 and the coil of lateral flow velocity indicator 104 respectively. Indicators 103 and 104 may comprise DC milliameters which are appropriately calibrated to indicate the flow. Capacitors 106 and 107 are placed in the feedback circuits of amplifiers 100 and 101 respectively and are large enough to effectively integrate the pulsating DC so as to provide steady DC for the milliameters.

The output of amplifier 100 is also fed through capacitor 111 and resistor 112 to amplifier 114. These components form a differentiating circuit which generates an output in accordance with the acceleration of fluid flow (i.e., the rate of change of fluid velocity). This "acceleration" signal is fed through resistor 119 to coil 103b of indicator 103 which drives an indicator needle indicating fluid acceleration.

Figure 10A:
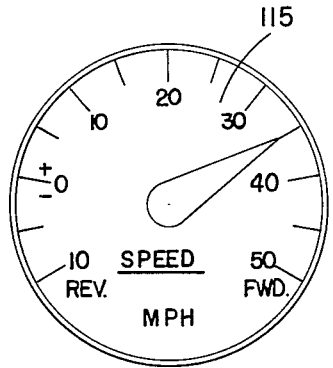
FIGS. 10A, 10B, 10C and 10D are pictorial drawings illustrating indicators which may be utilized with the preferred embodiment.
Figure 10B:
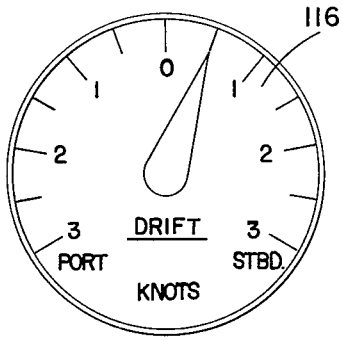
Figure 10C:
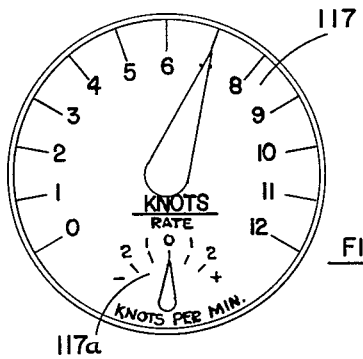
Figure 10D:
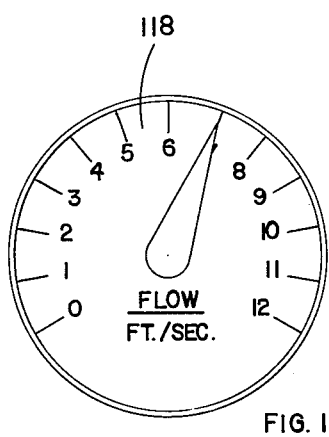

Referring now to FIGS. 10A and 10B, typical indicator dials which may be utilized for indicators 103 and 104 of FIG. 8, are respectively shown. These particular indicators are designed for use in an implementation of the device of the invention for indicating the speed of a boat. As shown in FIG. 10A, the longitudinal water speed, i.e., along the longitudinal axis of the boat, is indicated on dial 115, while as indicated in FIG. 10B, the lateral speed or "drift" of the boat is indicated on dial 116. FIG. 10C provides an indication of acceleration of fluid flow on dial 117a in addition to the velocity display on dial 117. Where flow rate of fluid is being measured from a fixed position, such as in measuring flow in a conduit, an indicator such as shown in FIG. 10D may be utilized whereon flow rate in feet/seconds is displayed on an indicator dial 118.

Figure 11:
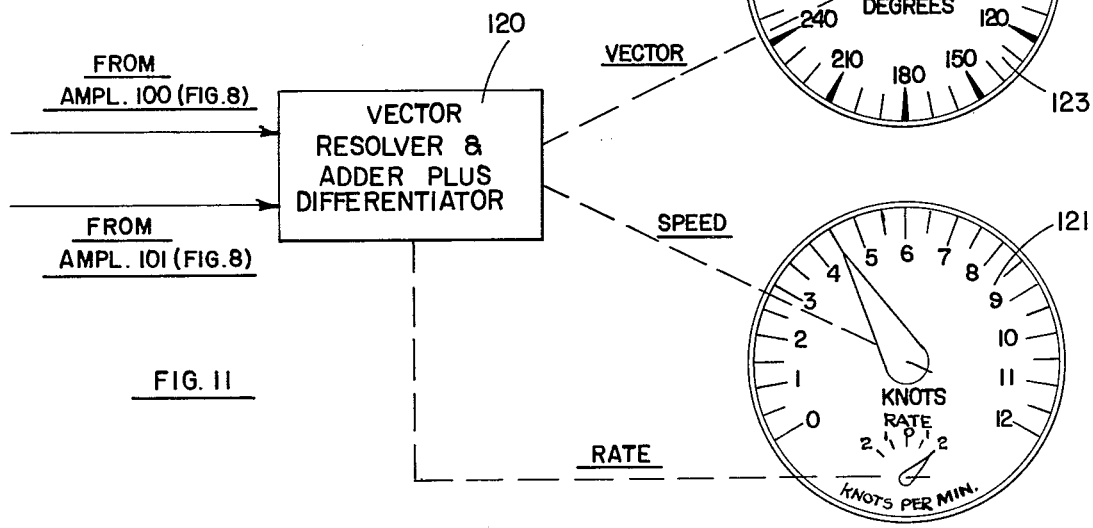
FIG. 11 is a schematic drawing indicating an alternative indicator system that may be utilized with the preferred embodiment.

Referring now to FIG. 11, a further type of display is illustrated wherein vector flow direction is displayed on one dial and flow velocity and accleration on another. In implementing this type of display, the output signals from amplifiers 100 and 101 are fed to vector resolver and adder plus differentiator 120. Vector resolver and adder processes the orthogonal flow signals so as to provide an output in accordance with their vector sum to indicator 121 and in accordance with the direction of this vector (flow direction) to indicator 123. A rate signal in accordance with fluid acceleration is also provided to indicator 121. It should be immediately apparent that the orthogonally related signals can also be used to provide other types of indications representing direction, speed and acceleration of fluid flow.

The present invention thus provides reliable and accurate means for furnishing a reading as to the speed, acceleration and direction of fluid flow relative to a body.

While the invention has been described and illustrated in detail, it is to be clearly understood that this is intended by way of illustration and example only and is not to be taken by way of limitation, the spirit and scope of this invention being limited only by the terms of the following claims.

I claim:

1. A Faraday effect device for providing indications as to the speed and direction of the flow of a fluid relative to a body on which the device is mounted, comprising:

a support structure mounted on said body, a pair of electrodes mounted on said support structure and positioned in said fluid, a permanent magnet rotatably mounted on said support structure in proximity to said electrodes, means for rotatably driving said magnet so as to generate a rotating magnetic field in said fluid, whereby an alternating current is developed between said electrodes having a magnitude and phase in accordance with the speed and direction respectively of fluid flow relative to said body, reference signal generating means for generating first and second electrical reference signals having the same frequency as said rotating magnetic field and predetermined phase relationships relative to each other and to the rotating magnetic field, first and second phase detectors, means for feeding the output of said electrodes as an input signal to both of said detectors, means for feeding said first and second reference signals as reference signals to said first and second detectors respectively, and indicator means responsive to the outputs of said detectors for providing an indication of the speed and direction of the fluid flow.

2. The device of claim 1 wherein said reference signal generating means comprises means for generating said first and second reference signals in quadrature phase relationship with each other.

3. The device of claim 2 wherein said reference signal generating means comprises a circular shutter assembly rotatably driven by said magnet drive means, having light transmitting and light blocking portions therearound, said last mentioned portions each encompassing one half the circumference of said assembly, and first and second photoelectric transducers spaced 90° from each other about said shutter assembly for generating said reference signals.

4. The device of claim 1 and additionally including means for differentiating the output of at least one of said phase detectors to generate a signal in accordance with the acceleration of the fluid flow, said indicator means comprising means responsive to the acceleration signal for providing an indication of the acceleration of the fluid flow.

5. The device of claim 1 wherein said electrodes are in concentric relationship with each other and with the rotation axis of said magnet.

6. The device of claim 1 wherein said means for feeding the output of said electrodes to said detectors comprises a pair of conductors mounted in said housing coaxial with the rotation axis of said magnet so as to minimize stray pickup therefrom.

7. The device of claim 1 wherein said means for feeding the output of said electrodes to said detectors includes an isolation transformer interposed between said conductors and said detectors.

8. The device of claim 1 wherein said body is a boat hull, said electrodes being mounted flush with the surface of said hull.

9. A Faraday effect device for providing indications of the speed and direction of the flow of a fluid relative to a body on which said device is supported comprising:
a housing fixedly mounted on said body with one end thereof in contact with said fluid,
a pair of electrodes mounted on said one end of said housing, said electrodes being in contact with said fluid, one of said electrodes being in external concentricity with the other of said electrodes,
a permanent magnet rotatably mounted in said housing in proximity to said electrodes for rotation about an axis coaxial with said electrodes,
motor means for rotatably driving said magnet,
means for generating first and second quadrature related reference signals rotatably driven by said motor means, said reference signals having a predetermined fixed phase relationship with the rotational position of said magnet,
first and second phase detectors,
means for feeding the first and second quadrature related signals to said first and second phase detectors respectively as reference signals therefor,
means for feeding the output of said electrodes to said detectors, said first and second detector outputs having magnitudes in accordance with the component speed of the fluid flow in a first direction and a direction normal to said first direction respectively, and
indicator means responsive to the outputs of said detectors for indicating the speed and direction of the fluid flow.

10. The device of claim 9 wherein said means for generating said reference signals comprises a circular shutter assembly having an optical fence encompassing one half the circumference thereof, driven by said motor means and a pair of photoelectric transducers positioned along said assembly at positions 90 rotational degrees apart.

11. The device of claim 9 wherein said means for feeding the output of said electrodes to said detectors comprises a pair of conductors mounted in said housing coaxial with the rotation axis of the magnet to minimize stray pickup therefrom.

12. The device of claim 11 wherein said means for feeding the output of said electrodes to said detectors additionally includes an isolation transformer interposed between the conductors and the detectors.

13. The device of claim 10 wherein said optical fence is in the form of a half cylinder, the transducers comprising a light source and a photoelectric detector between which said fence passes with rotation of the shutter assembly.

14. The device of claim 9 wherein said body is a boat hull, said electrodes being positioned flush with the surface of said hull.

15. The device of claim 9 and additionally including means for differentiating the output of at least one of said phase detectors to generate a signal in accordance with the acceleration of the fluid flow, said indicator means comprising means responsive to the acceleration signal for providing an indication of the acceleration of the fluid flow.

* * * * *